US012397758B2

(12) United States Patent
Laine et al.

(10) Patent No.: US 12,397,758 B2
(45) Date of Patent: Aug. 26, 2025

(54) METHODS FOR SETTING A HEAVY DUTY VEHICLE IN MOTION

(71) Applicant: VOLVO TRUCK CORPORATION, Gothenburg (SE)

(72) Inventors: Leo Laine, Härryda (SE); Mattias Åsbogård, Mölnlycke (SE); Leon Henderson, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 270 days.

(21) Appl. No.: 17/758,772

(22) PCT Filed: Jan. 15, 2020

(86) PCT No.: PCT/EP2020/050850
§ 371 (c)(1),
(2) Date: Jul. 13, 2022

(87) PCT Pub. No.: WO2021/144010
PCT Pub. Date: Jul. 22, 2021

(65) Prior Publication Data
US 2023/0339477 A1   Oct. 26, 2023

(51) Int. Cl.
*B60T 8/172*   (2006.01)
*B60T 8/17*   (2006.01)
(Continued)

(52) U.S. Cl.
CPC ............ *B60T 8/172* (2013.01); *B60T 8/1708* (2013.01); *B60T 8/171* (2013.01); *B60T 8/175* (2013.01);
(Continued)

(58) Field of Classification Search
CPC ............... B60W 40/06; B60W 40/101; B60W 2520/105; B60W 2520/26; B60T 8/172;
(Continued)

(56) References Cited

U.S. PATENT DOCUMENTS 5,269,391 A   12/1993   Ito et al.
5,394,329 A   2/1995   Bridgens
(Continued)

FOREIGN PATENT DOCUMENTS

CN   202186297 U   4/2012
CN   109415041 A   3/2019
(Continued)

OTHER PUBLICATIONS

Chinese Office Action dated Dec. 22, 2023 in corresponding Chinese Patent Application No. 202080092633.3, 17 pages.
(Continued)

*Primary Examiner* — Isaac G Smith
(74) *Attorney, Agent, or Firm* — Venable LLP; Jeffri A. Kaminski

(57) ABSTRACT

A method for setting a heavy duty vehicle in motion. The method includes obtaining a motion instruction for setting the vehicle in motion, determining a target wheel slip value corresponding to a wheel slip suitable for executing to the motion instruction, and controlling wheel speed to maintain wheel slip of the vehicle at the target wheel slip value.

16 Claims, 4 Drawing Sheets

(51) Int. Cl.
  *B60T 8/171* (2006.01)
  *B60T 8/175* (2006.01)
  *B60T 8/1761* (2006.01)
  *B60W 40/06* (2012.01)
  *B60W 40/101* (2012.01)

(52) U.S. Cl.
  CPC ........ *B60T 8/1761* (2013.01); *B60T 8/17616* (2013.01); *B60W 40/06* (2013.01); *B60W 40/101* (2013.01); *B60T 2210/12* (2013.01); *B60T 2220/04* (2013.01); *B60T 2240/00* (2013.01); *B60T 2250/04* (2013.01); *B60T 2270/86* (2013.01); *B60W 2520/105* (2013.01); *B60W 2520/26* (2013.01)

(58) Field of Classification Search
  CPC ........ B60T 8/1708; B60T 8/171; B60T 8/175; B60T 8/1761; B60T 8/17616; B60T 2210/12; B60T 2220/04; B60T 2240/00; B60T 2250/04; B60T 2270/86
  USPC .......................................................... 701/71
  See application file for complete search history.

(56) References Cited

U.S. PATENT DOCUMENTS

| | | | |
|---|---|---|---|
| 5,713,642 A | 2/1998 | Okazaki | |
| 2008/0071429 A1* | 3/2008 | Kraimer | G08C 17/02 701/2 |
| 2008/0264709 A1 | 10/2008 | Fenker et al. | |
| 2010/0009808 A1* | 1/2010 | Ohtsu | B60T 8/17616 477/185 |
| 2013/0260961 A1* | 10/2013 | Dedo | B60K 17/046 477/77 |
| 2015/0073674 A1 | 3/2015 | Kelly et al. | |
| 2015/0175009 A1 | 6/2015 | Beever | |
| 2015/0203119 A1 | 7/2015 | Bird et al. | |
| 2016/0082972 A1* | 3/2016 | Fairgrieve | B60W 50/14 701/84 |
| 2017/0174192 A1 | 6/2017 | Ying | |
| 2019/0248370 A1* | 8/2019 | Cunningham | B60W 30/18018 |
| 2019/0263409 A1* | 8/2019 | Yasutomi | B60W 30/18145 |
| 2020/0278025 A1* | 9/2020 | Bradley | F16H 61/66236 |
| 2021/0078581 A1* | 3/2021 | Velazquez Alcantar | B60L 3/10 |

FOREIGN PATENT DOCUMENTS

| | | | | |
|---|---|---|---|---|
| DE | 10112351 A1 | 9/2002 | | |
| DE | 102013011230 A1 | 1/2015 | | |
| JP | H10194107 A | 7/1998 | | |
| JP | 2000313246 A | 11/2000 | | |
| JP | 2001138888 A | 5/2001 | | |
| JP | 2001253334 A | 9/2001 | | |
| JP | 2007196705 A | 8/2007 | | |
| JP | 2007210612 A | * 8/2007 | ......... | B62D 15/0285 |
| JP | 2009137362 A | * 6/2009 | | |
| JP | 2015056978 A | 3/2015 | | |
| JP | 6226987 B2 | 11/2017 | | |
| JP | 2017222357 A | 12/2017 | | |
| JP | 2018058584 A | 4/2018 | | |
| JP | 2019142262 A | 8/2019 | | |
| JP | 2023517445 A | 4/2023 | | |
| WO | 2009080416 A1 | 7/2009 | | |
| WO | 2014184344 A1 | 11/2014 | | |

OTHER PUBLICATIONS

Japanese Office Action dated Sep. 1, 2023 in corresponding Japan Patent Application No. 2019-142262, 4 pages.
International Search Report and Written Opinion in corresponding International Application No. PCT/EP2020/050850 mailed Oct. 2, 2020 (15 pages).
International Preliminary Report on Patentability in corresponding International Application No. PCT/EP2020/050850 mailed May 4, 2022 (9 pages).

* cited by examiner

METHODS FOR SETTING A HEAVY DUTY VEHICLE IN MOTION

CROSS-REFERENCE TO RELATED APPLICATIONS

This application is a U.S. National Stage application of PCT/EP2020/050850, filed Jan. 15, 2020 and published on Jul. 22, 2021, as WO 2021/144010, all of which is hereby incorporated by reference in its entirety.

TECHNICAL FIELD

The present disclosure relates to methods for bringing heavy duty vehicles into motion from a standstill or from a state of low velocity. The invention can be applied in heavy-duty vehicles, such as trucks and construction equipment. Although the invention will be described mainly with respect to semi-trailer vehicles and trucks, the invention is not restricted to this particular type of vehicle but may also be used in other types of vehicles such as dollies and passenger cars.

BACKGROUND

Starting heavy duty vehicles from a standstill or from a state of low velocity may be a challenge. It is normally desired to accelerate the vehicle up to some desired velocity in a smooth and controlled manner, but variable friction road conditions, uneven road surfaces, and/or stesp slopes tend to complicate vehicle control. Trailers which have been parked for some time can be particularly challenging to bring into motion due to, e.g., brakes that do not release properly and fifth wheel connections that resist vehicle start. Experienced drivers may be able to apply just the right amount of torque control to start the vehicle smoothly in dependence of current driving conditions. However, there is a need for methods to assist unexperienced drivers in negotiating challenging vehicle start scenarios. There is also a need for methods which can be automated for use in autonomous vehicles where no driver is present.

Starting a heavy duty vehicle from standstill may be especially challenging if the vehicle is powered by one or more electrical machines, since electrical machines are capable of rapidly providing high peak torque (at least for a limited period of time), which may result in severe wheel slip and loss of lateral control. On the other hand, the high peak torques available reduce the need for complex gear arrangements.

US20150175009 A1 provides a method for controlling a vehicle during launch. The disclosed method is based on torque control which may be sub-optimal in some cases.

US20190248370A1 discloses methods for controlling a vehicle during launch which does not fully solved the above-mentioned issues.

Thus, there is a need for improved methods for setting a heavy-duty vehicle in motion.

SUMMARY

It is an object of the present disclosure to provide improved methods for bringing heavy duty vehicles into motion from a standstill or from a state of low velocity. This object is at least in part obtained by a method for setting a heavy duty vehicle in motion. The method comprises obtaining a motion instruction for setting the vehicle in motion, determining a target wheel slip value corresponding to a wheel slip suitable for executing the motion instruction, and controlling wheel speed to maintain wheel slip of the vehicle at the target wheel slip value.

This way a controlled vehicle start is obtained in an efficient manner, since control is based directly on wheel slip, or wheel speed difference with respect to the velocity of the vehicle, as opposed to torque-based control. Control is shifted more towards the propulsion unit or units and away from central vehicle control, which is an advantage since control loops of higher bandwidth (faster loops) can be realized in this manner. Unforeseen resistances and transients can be better handled due to the increased control bandwidth locally compared to centrally.

According to aspects, the method comprises controlling wheel speed to maintain wheel slip of a respective wheel of the vehicle at the target wheel slip value based on a relationship $$\omega = \frac{\lambda_{target} * v_{ref} + v_x}{R}$$

where w represents wheel speed, $\lambda_{target}$ represents the target wheel slip value, $v_{ref}$ is a reference velocity, $v_x$ is vehicle velocity in the reference system of the wheel, and R represents wheel radius.

Thus, differently from torque-based control systems for vehicle start, wheel speed w is directly controlled to obtain the desired wheel slip during the start event, i.e., the difference in speed between that of the wheel and that of the vehicle is directly controlled in order to perform a smooth and controlled start of the vehicle. Transients resulting in undesired speed differences can quickly be accounted for due to the high control bandwidths resulting from the local control.

According to aspects, the motion instruction comprises a requested acceleration by the vehicle, and the target wheel slip is determined in dependence of a longitudinal force required to reach the requested acceleration.

This way, advantageously, an acceleration request can be fulfilled in a controlled manner.

According to aspects, the method comprises determining the target wheel slip value based on the longitudinal force required to reach the requested acceleration and on a pre-determined relationship between longitudinal force and longitudinal wheel slip ratio.

This way, advantageously, the disclosed methods can be adapted to different vehicle types, or even to individual vehicles. Specific characteristics such as tyre wear and driving conditions can be accounted for by adjusting the pre-determined relationship between longitudinal force and longitudinal wheel slip ratio.

According to aspects, the method comprises determining the longitudinal force required to reach the requested acceleration based on a relationship $Fx' = m*a_{req}$, where m is a mass of the vehicle and $a_{req}$ is the requested acceleration by the vehicle.

This way, advantageously, gross cargo weight (GCW) of the vehicle can be accounted for in optimizing a vehicle start maneuver.

According to aspects, the method comprises controlling wheel speed to maintain wheel slip of the vehicle at the target wheel slip value based on a relationship $$\omega = \frac{\lambda_{target} * v_{ref} + v_x}{R}$$

where $v_{ref}$ is set to the requested end velocity by the vehicle.

This way, advantageously, wheel speed is directly controlled to obtain a smooth vehicle start. The reference velocity can be adapted to further optimize vehicle start, as will be explained in the following.

According to aspects, the method comprises controlling vehicle velocity based on a torque request with a fixed wheel slip limit if the vehicle velocity is above a configured threshold velocity.

This way, advantageously, the vehicle control can be transferred to known control methods following vehicle start, i.e., as the vehicle has been successfully brought into motion from a standstill or from a low velocity. This may simplify vehicle operation at higher speeds where a slip limit can be imposed instead of the direct wheel slip control employed during vehicle start.

According to aspects, the motion instruction comprises a distance to be traversed by the vehicle from standstill to standstill, and the method comprises integrating wheel speed over time to reach the distance as $$d_{req} = \int WR \, dt$$

This type of control may facilitate, e.g., docking the vehicle at a loading bay. The wheel slip based start control allows for a smooth motion by the vehicle from standstill to standstill.

According to aspects, the motion instruction corresponds to a request for a peak torque to be applied for a limited period of time.

The peak torque of an electric machine can normally be drawn only during limited periods of time, such as during vehicle start. This extra torque may facilitate stating heavy vehicles in challenging conditions, such as uphill start and the like. This high available torque allows a wheel end module to counter transients and unforeseen events which impact required torque during the start event. Advantageously, the high peak torque reduces the need for complex gear systems. Thus, a reduced number of gears or even a single fixed gear system may be sufficient.

According to aspects, the method comprises transmitting a wheel speed request to an electric machine connected to one or more drive wheels via an open differential arrangement. The method comprises controlling wheel speed by the electric machine to maintain wheel slip of the vehicle at the target wheel slip value.

The methods and techniques disclosed herein are applicable also to differential drive arrangements, which is an advantage.

According to aspects, the method comprises increasing the target wheel slip value from an initial value up to a pre-determined end value over a configured period of time.

This way, an even smoother vehicle start is obtained.

There is also disclosed herein control units, computer programs, computer readable media, computer program products, propulsion systems and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1A:
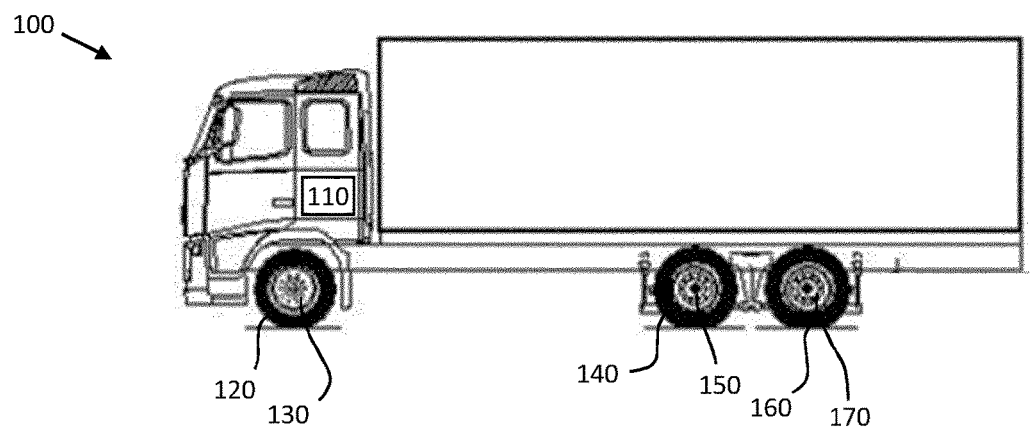
FIGS. 1A-B schematically illustrate some example heavy duty vehicles.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1B:
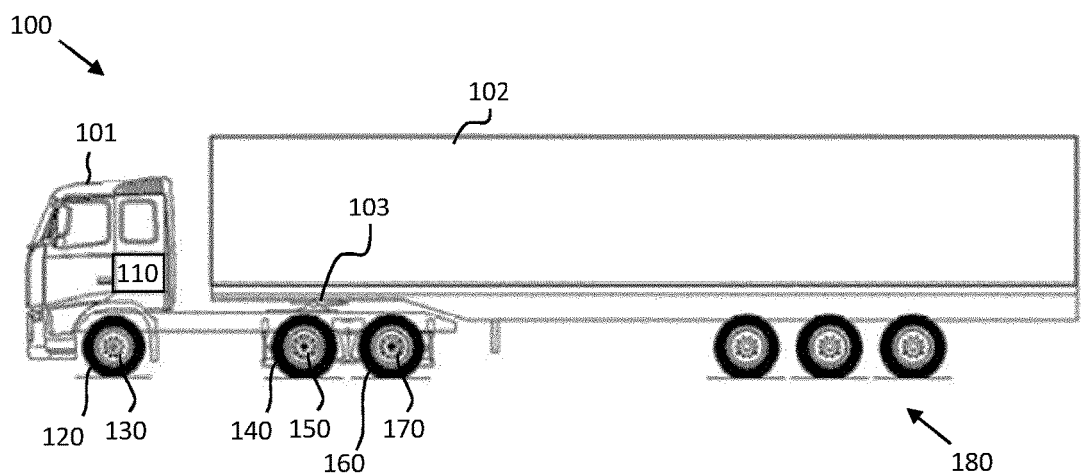

FIGS. 1A and 1B illustrate some example vehicles 100 for cargo transport where the methods for setting heavy duty vehicles in motion disclosed herein can be applied with advantage. FIG. 1A shows a truck supported on wheels 120, 140, and 160, some of which are driven wheels.

FIG. 1B shows a semitrailer vehicle where a tractor unit 101 tows a trailer unit 102. The front part of the trailer unit 102 is supported by a fifth wheel connection 103, while the rear part of the trailer unit 102 is supported on a set of trailer wheels 180.

Figure 2A:
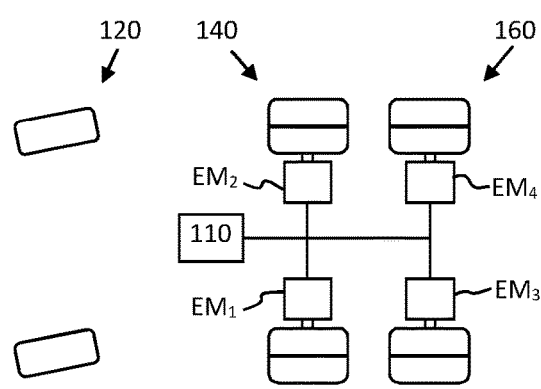
FIGS. 2A-B show example electrical propulsion systems.
Figure 2B:
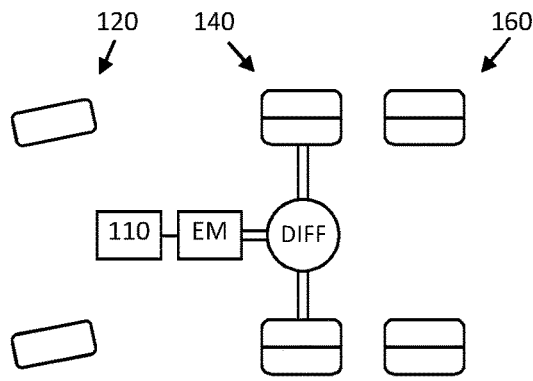
Figure 3:
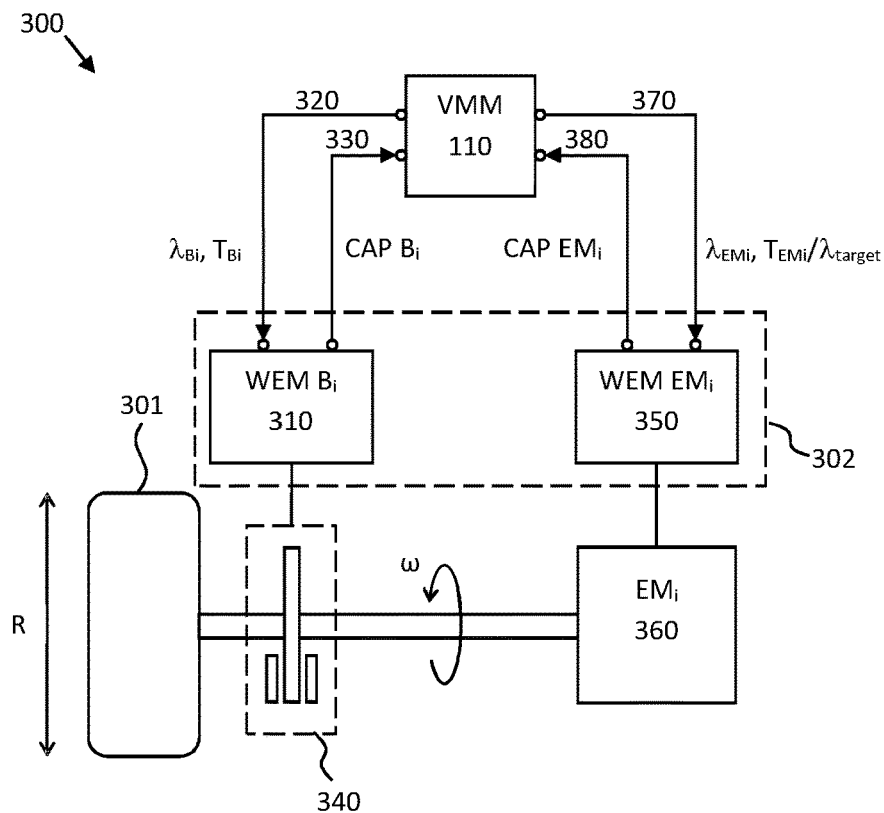
FIG. 3 shows an example wheel brake and electric propulsion system.

Each wheel, or at least a majority of the wheels, is associated with a respective wheel service brake 130, 150, 160 (trailer unit wheel brakes are not indicated in FIGS. 1A-1C). This wheel service brake may, e.g., be a pneumatically actuated disc brake or drum brake. The wheel brakes are controlled by brake controllers. Herein, the terms brake controller, brake modulator, and wheel end module will be used interchangeably. They are all to be interpreted as a device which controls applied braking force on at least one wheel of a vehicle, such as the vehicle 100. Each of the wheel brake controllers is communicatively coupled to a control unit 110, allowing the control unit to communicate with the brake controllers, and thereby control vehicle braking. This control unit may potentially comprise a number of sub-units distributed across the vehicle, or it can be a single physical unit. The control unit 110 may, e.g. allocate brake force between wheels to maintain vehicle stability. Some of the wheels on the vehicles 100 are driven by electrical machines. FIG. 2A shows an example drive arrangement where two axles comprise wheels that are driven by electrical machines $EM_1$-$EM_4$. The electrical machines are controlled by the control unit 110, which will be discussed in more detail below in connection to FIG. 3. Each of the electrical machines $EM_1$-$EM_4$ may generate both acceleration forces as well as deceleration (braking) forces. For instance, an electrical machine may be configured as a regenerative brake which produces electrical power during vehicle retardation. FIG. 2B illustrates another example electric propulsion system where one or more electric machines EM are connected to the driven wheels via a differential, such as an open differential. The electric machine or machines are again controlled by the control unit 110. The control unit 110 controls both propulsion and braking by the electric machine or machines while monitoring wheel slip to keep slip within configured limits. The control is normally applied for each wheel separately. FIG. 3 illustrates a control system 300 for a wheel 301, such as one of the wheels 140, 160. This control system 300 is relevant, e.g., for the set-up illustrated in FIG. 2A. The wheel has an effective radius R and a rotational velocity @ (according to the definition by the SAE Vehicle Dynamics Standards Committee Jan. 24, 2008). The control system 300 comprises a service brake wheel end module (WEM $B_i$) 310 arranged to control wheel braking by a service brake actuator 340, here exemplified by a disc brake. The system 300 also comprises an electrical machine EM; 360 arranged to power the wheel 301 and also to apply braking force to reduce wheel rotational velocity @. An electrical machine wheel end module (WEM $EM_i$) 350 is arranged to control the electrical machine 360. It is appreciated that the two WEMs may be comprised in a single physical unit 302 or configured as separate physical units.

The vehicle control unit 110, here shown as a Vehicle Motion Management (VMM) system is arranged to control operations by the two wheel end modules 310, 350. The control is normally based on transmitted torque requests $T_{Bi}$ 320 and $T_{EMi}$ 370, as well as imposed wheel slip limits $\lambda_{Bi}$ and $\lambda_{EMi}$.

The present disclosure mainly relates to setting a heavy duty vehicle 100 in motion, i.e., launching the vehicle from standstill or from a state of low velocity, although some aspects also relate to relocating the vehicle a pre-determined distance from standstill. The torque control loops of a heavy duty vehicle are normally associated with time constants on the order of 10 ms or so. In some scenarios this time constant reduces overall vehicle control bandwidth to a point where the startability of the heavy duty vehicle may be negatively affected. To improve control during vehicle launch, it is proposed herein to base control on wheel slip or equivalently on a configured wheel speed target in relation to a vehicle speed instead of on torque as in the known methods.

The time constants associated with many motion support devices (MSD) is on the order of 1 ms or so, which means that control loops implemented locally in or close to the MSD can be significantly faster than control loops involving higher layer vehicle control units such as a vehicle motion management system or the like. Also, optionally, the herein disclosed methods may be configured to generate high peak torques by the electric machine for a limited period of time. This allows, e.g., to quickly adapt to overcome transients and unforeseen resistances during vehicle start.

According to the present disclosure, the electric machine WEM 350 is requested to maintain wheel slip at a target wheel slip value $\lambda_{target}$ which has been determined in dependence of a motion instruction for setting the vehicle in motion. The electric machine then simply applies the wheel speed required to obtain the target wheel slip during the launch operation. For instance, if the target wheel slip is set at 0.1, then the wheel rotational velocity will be continuously set by the WEM at a relative difference of 0.1 above the vehicle velocity so that the wheel will always be slipping by the configured amount. In other words, a target wheel speed difference with respect to the velocity of the vehicle is configured and then controlled against. This is possible at least partly since the electric machine is capable of rapidly delivering high torque, i.e., it is normally capable of generating any wheel slip requested from it (although it would not be advisable to request too large slip, since this would result in tyre burnout). The peak torque capability of an electric machine is normally very high but can only be obtained for a limited duration of time, as will be discussed in more detail below in connection to FIG. 6. Thus, drawing on the high peak torque from the electric machine or machines during vehicle start is advantageous.

Known methods of controlling vehicles during launch are instead based on torque control, meaning that the electric machines are sent torque requests which the electric machine then attempts to fulfill to the best of its ability under some slip limit constraint. Compared to the known methods for launching heavy duty vehicles, the proposed methods move control closer to the electric machines.

Longitudinal wheel slip 1 may according to SAE J670 be defined as $$\lambda = \frac{R\omega - v_x}{v_{ref}}$$

where R is an effective radius of a corresponding free-rolling tire, @ is the angular velocity of the wheel, and $v_y$ is the longitudinal speed of the wheel (in the coordinate system of the wheel). The difference is normalized by a reference velocity $v_{ref}$ which normally equals max($|R_w|$, $|v_x|$). When $v_{ref}$=max($|R_w|$, $|v_x|$) then $\lambda$ is bounded between −1 and 1 and quantifies how much the wheel is slipping with respect to the road surface in a relative sense.

The reference velocity $v_{ref}$ may however according to the present technique also be chosen differently. For instance, if $v_{ref}$=1 then the longitudinal wheel slip is equal to speed difference between wheel (R$\omega$) and vehicle ($v_x$). $v_{ref}$ can also be chosen as a target speed of the vehicle to be obtained after start.

The vehicle control unit 110 maintains information on $v_y$ (in the reference frame of the wheel), while a wheel speed sensor or the like can be used to determine w. Notably, in the following, when limits on wheel slip are discussed, it is the magnitude or absolute value of the wheel slip which is limited. I.e., an increased wheel slip limit may either refer to a larger positive allowed wheel slip or a smaller negative allowed wheel slip. The present disclosure mainly considers acceleration during vehicle start, i.e., the wheel slip is normally positive herein, since $v_x \leq R\omega$ while the vehicle is set in motion, i.e., during vehicle start.

Some modern electrical machines and service brake systems are capable of fine grained slip control. For instance, some modern brake controllers are able to keep wheel slip λ within say +/−0.02 of some nominal value. Fine grained slip control is equivalent to fine grained control of speed difference between wheel (Rω) and vehicle ($v_x$).

Figure 4:
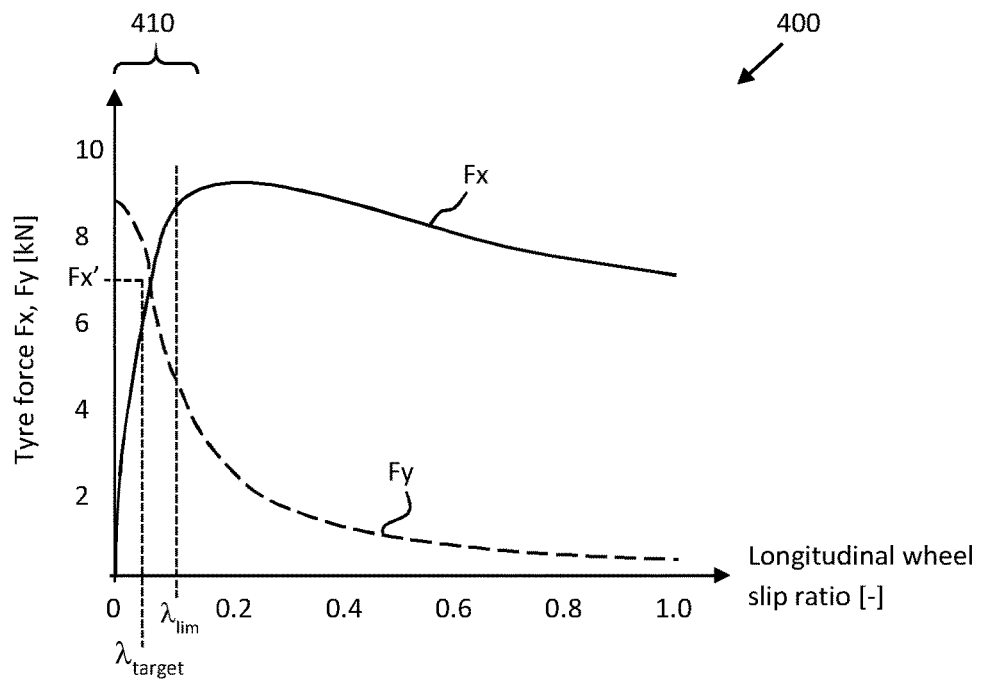
FIG. 4 is a graph illustrating tyre force vs. slip ratio.

FIG. 4 is a graph showing achievable tyre force as function of wheel slip. The longitudinal obtainable tyre force Fx shows an almost linearly increasing part 410 for small wheel slips, followed by a more non-linear behaviour for larger wheel slips. The obtainable lateral tyre force Fy decreases rapidly even at relatively small wheel slips. It is normally desirable to maintain vehicle operation in the linear region 410, where the obtainable longitudinal force is easier to predict, and where lateral tyre force can be generated if needed. To ensure operation in this region, a wheel slip limit $\lambda_{LIM}$ on the order of, e.g., 0.1, can be imposed on the WEM of the service brake and/or on the electric machine.

A relationship 400 such as the one illustrated in FIG. 4 may be tabulated in dependence of road conditions. For instance, the relationship can be pre-determined in dependence of road friction coefficient, and the correct relationship can be selected based on an estimated road friction condition at any given time. The relationship can also be continuously estimated during vehicle operation. The relationship can be determined for a given vehicle type or even for an individual vehicle. Specific vehicle characteristics can be accounted for by adapting the relationship 400.

Now, suppose a given acceleration $a_{req}$ is requested from the control unit 110 by some higher layer control function, such as a traffic situation management (TSM) function, and that the vehicle is at a standstill or is moving with some small velocity. The control unit 110 can determine a force Fx' required to accelerate the vehicle according to the request. This force Fx' can be determined based on more or less complex models of the vehicle, but a simple relationship that can be applicable in at least some scenarios is the linear dependence between force and vehicle mass given by $F_x^1 = m * a_{req} + F_{load}$, where $F_x^1$ is the required force, $a_{req}$ is the vehicle mass, $a_{req}$ is the requested acceleration, and $F_{load}$ is a road resistance term. Knowing at least an approximate value for m and $F_{load}$. The target wheel slip value $\lambda_{target}$ can be found from a relationship 400 like that shown in FIG. 4 by matching the required tyre force to the corresponding slip value (in this example about $F_x^1 \sim 7$ KN is required for the requested acceleration, which translates into a target wheel slip of about 0.05). Now, this target wheel slip can be sent to the WEM 350 of the electric machine 360, which then controls the electric machine to maintain the desired target wheel slip value. The actual torque which the WEM applies to obtain the wheel slip is no longer of importance, since the control is wheel slip based instead of torque based as in the known methods referred to above. The wheel speed which is configured by the WEM may, e.g., be determined from the wheel slip expression above as $$\omega = \frac{\lambda_{target} * v_{ref} + v_x}{R}$$

where ω represents wheel speed, $\lambda_{target}$ represents the target wheel slip value, $v_{ref}$ is some configurable reference velocity, $v_x$ is vehicle velocity in the reference system of the given wheel, and R represents effective wheel radius.

According to some aspects, at very low speeds $v_{ref}$ may be set to a fixed arbitrary value, then above a certain vehicle speed threshold it can be set to, e.g., max(|Rω|, |$v_x$|) as per the SAE J670 definition.

According to other aspects, the drive arrangement on the vehicle 100 is a differential drive arrangement, such as an open differential drive arrangement. The techniques disclosed herein are applicable also for this case. The VMM then assumes the role of the slip controller, and the equations disclosed herein are used to determine a wheel speed request which the electric machine then tries to maintain. To do this, it may temporarily exploit available peak torque levels as discussed below in connection to FIG. 6.

Of course, some limits may be imposed on the configured wheel speed, e.g., to prevent too large and sudden accelerations in case road friction coefficient has been estimated with some error. I.e., wheel speed ω may be limited to maintain vehicle acceleration below a pre-configured maximum acceleration value. The wheel speed ω may also be limited to maintain wheel speed below a pre-configured maximum wheel speed value.

For docking the vehicle 100 at a loading dock, or for high precision maneuvering, it may be desired to move the vehicle a given distance in some direction starting from standstill or from a low velocity. The motion instruction may then also comprise a distance $d_{req}$ to be traversed by the vehicle. This maneuver can be accomplished by integrating wheel speed over time to traverse the distance $d_{req}$ as $$d_{req} = \int \omega R \, dt$$

as the integrated wheel speed approaches the requested distance, the vehicle 100 can be braked, and eventually stopped once the requested distance has been traversed. Moving the vehicle a given distance can be combined with the various launch techniques disclosed herein.

Figure 5:
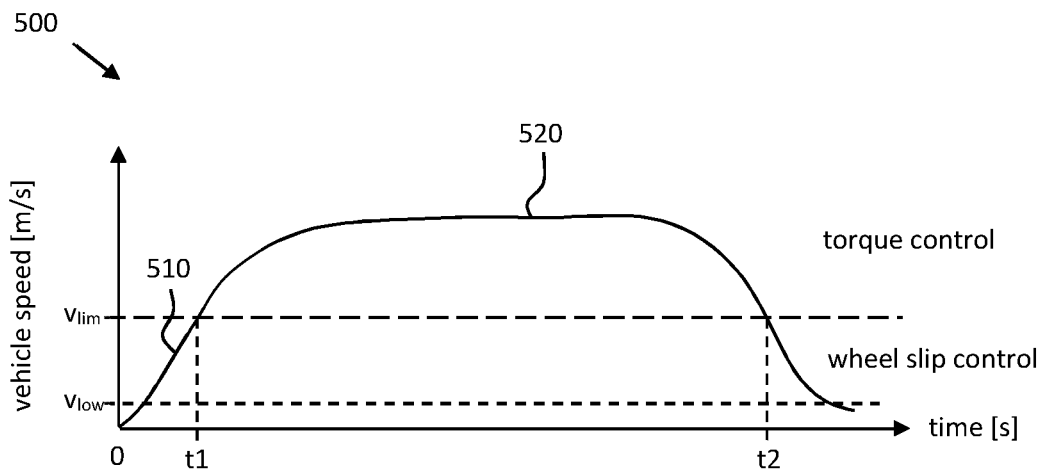
FIG. 5 is a graph illustrating control modes vs vehicle velocity.

FIG. 5 shows a graph 500 of vehicle speed vs time. The vehicle 100 is first launched from standstill at time t=0 and accelerated up to some operation velocity which it maintains for some time, until the vehicle is again brought to a standstill. According to some aspects of the disclosed methods, the vehicle is controlled based on wheel slip (or, equivalently, wheel speed difference with respect to vehicle speed) as long as the vehicle is moving at velocities 510 below a pre-determined velocity limit $v_{lim}$ of, say 1 m/s. Once this velocity has been breached (at time t1 in FIG. 5), the vehicle control is transferred to known torque-based control methods 520, and the wheel slip control is performed based on a fixed wheel slip limit, such as the wheel slip limit $\mu_{LIM}$ exemplified in FIG. 4. The vehicle is once again controlled based on wheel slip (from time 12) as the vehicle nears standstill at the end of the journey.

With reference to the relationship $$\omega = \frac{\lambda_{target} * v_{ref} + v_x}{R}$$

according to some aspects, there is a second threshold $v_{low}$ below which $v_{ref}$ is set to some fixed value, e.g. $v_{ref}=1$, which means that control is essentially based on wheel speed difference with respect to vehicle velocity. Above this threshold $v_{ref}$ may be adapted as $v_{ref}=\max(|R\omega|, |v_x|)$ as per the SAE J670 definition. For example, at time zero the vehicle starts with a wheel speed target based on a fixed reference velocity in the slip equation discussed above, e.g. $v_{ref}=1$. Then, above the speed threshold $V_{low}$, the control strategy is changed to use the classic definition of wheel slip where $v_{ref}$=max($|R\omega|$, $|v_x|$). Above the higher speed limit $v_{lim}$ shown in FIG. 5, the vehicle control strategy is changed to torque-based control. It is noted that slip limits will normally be imposed by the control unit during operation in the torque-based control region.

Figure 6:
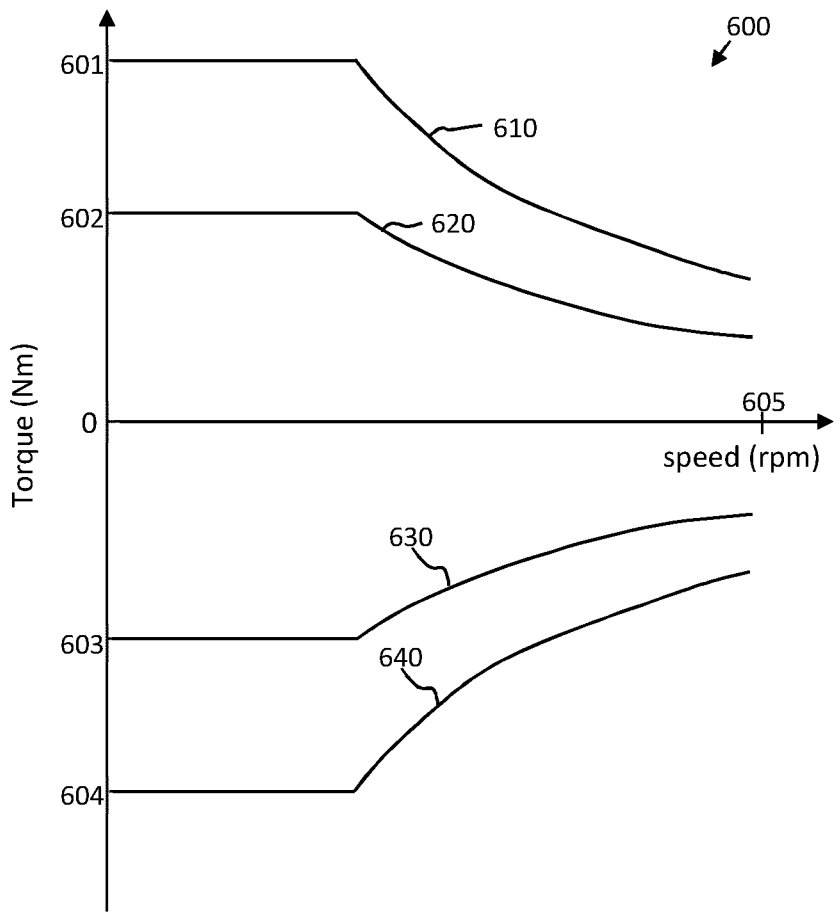
FIG. 6 is a graph illustrating torque capability vs engine speed.

FIG. 6 is a graph showing example torque capabilities 600 of an electrical machine in dependence of engine speed for propulsion (positive torque) and braking (negative torque) operations. These types of capabilities can be communicated to the vehicle control system as part of the capability messages discussed in connection to, e.g., FIG. 3. Similar curves can of course be drawn also for reversing (negative engine speeds). Depending on various design parameters of the electrical machine and the surrounding vehicle systems, such as cooling systems, design of overload resistors, and component robustness in general, most electrical machines can be associated with a continuous torque capability that can be maintained over a longer period of time and a peak torque capability which is a torque level that can only be generated for a limited period of time before, e.g., engine temperature reaches a critical level.

FIG. 6 shows an example positive maximum torque capability 610 and an example positive continuous torque capability 620 which is smaller than the peak capability but which on the other hand can be maintained for longer periods of time. For reasonably low engine speeds, say below a few thousand rpm, the machine can provide a torque value 602 over longer time periods, but may deliver significantly higher torques 601 during limited time periods, such as 10-30 seconds. Such peak torque values are particularly useful during vehicle star where a heavy vehicle is to be put into motion from standstill or from a low velocity. Both torque values 610, 620 tend to drop with engine speed up to some maximum engine speed 605. An electrical machine may be associated with a maximum engine speed 605 of about 10000 rpm or so.

This means that, for short but intensive propulsion and braking situations, the VMM 100 has the option to temporarily overload the electrical machines up to a known overload level and to maintain load at this level for a limited period of time. This in turn means that the design of the transmission system can be simplified or even reduced down to a single fixed gear transmission, which is an advantage.

A similar situation is seen for negative torques, where the machine has the capability to deliver a continuous negative torque 630 for an extended period of time which has a smaller magnitude 603 compared to a peak negative torque value 604, although this is not so useful for vehicle startability.

Consequently, it is possible to overload an electrical machine for limited periods of time, such as during vehicle start from standstill or from a low velocity. The control unit 110 can use this information during vehicle control. This high available peak torque together with high control bandwidth results in improved vehicle startability compared to the known methods.

Figure 7:
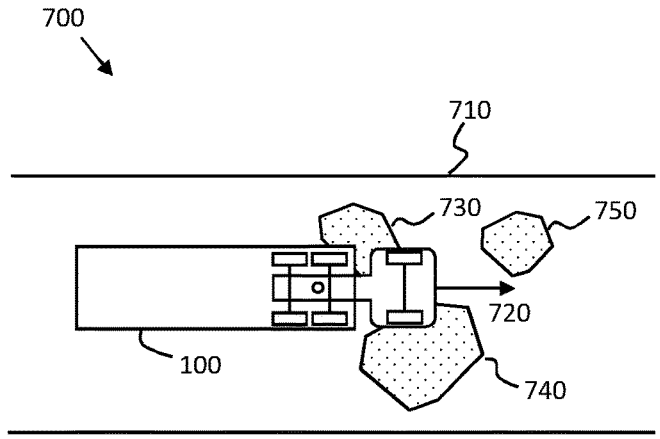
FIG. 7 shows an example vehicle launch scenario.

FIG. 7 shows an example vehicle launch scenario 700 where the techniques disclosed herein may be advantageously put to use. The vehicle 100 will here experience varying friction conditions 730, 740, 750 as it is accelerated 720. The road may also be uneven and/or sloping. A torque-based start control would face challenges since rapid control of wheel torque is required as the road or vehicle conditions change. For instance, the VMM may be operating at an update rate of about 10 ms while the WEM may be operating at an update rate of about 1 ms, i.e., ten times faster. This means that the WEM is able to adjust faster to transient effects and thereby overcome unforeseen resistances during vehicle start in a better way compared to the VMM-based control which will be slower to react to unforeseen changes in driving conditions. The proposed technique on the other hand simply determines suitable target wheel slip values to be maintained by the different WEMs on each driven wheel, and communicates these target wheel slip values to the WEMs which then control the electric machines to maintain wheel slip at the requested values by setting appropriate wheel speeds in dependence of the vehicle speed and the configured target wheel slip. This way control is transferred down in the control stack closer to the actual electric machine, which improves overall vehicle startability.

Figure 8:
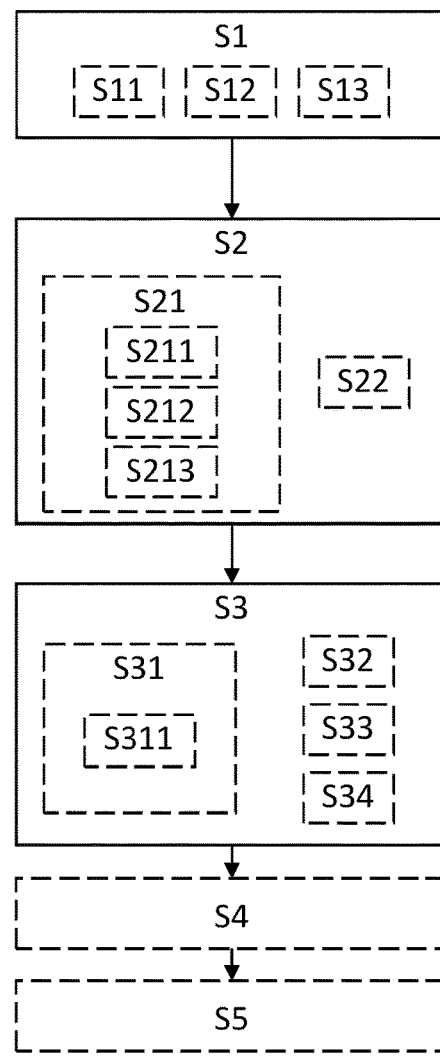
FIG. 8 is a flow chart illustrating methods.

FIG. 8 is a flow chart which summarizes the above discussion. There is illustrated a method for setting a heavy duty vehicle 100 in motion. The method comprises obtaining S1 a motion instruction for setting the vehicle 100 in motion.

The motion instruction S11 may comprise a requested acceleration $a_{req}$ by the vehicle 100, and also a target velocity to be attained by the vehicle. In some cases, a travelled distance is also comprised in the motion instruction. In case the motion instruction S13 comprises a distance $d_{req}$ to be traversed by the vehicle 100 from standstill to standstill, the method optionally comprises integrating S4 wheel speed over time to reach the distance $d_{req}$ as $$d_{req} = \int \omega R \, dt$$

The method comprises determining S2 a target wheel slip value $\lambda_{target}$ corresponding to a wheel slip suitable for executing to the motion instruction.

The target wheel slip $\lambda_{target}$ may, for instance be determined S21 in dependence of a longitudinal force Fx' required to reach the requested acceleration.

The method also comprises controlling S3 wheel speed $\omega$ to maintain wheel slip of the vehicle 100 at the target wheel slip value $\mu_{target}$. Thus, the WEM for each driven wheel is not requested to provide a given torque as is common in the known methods for launching heavy duty vehicles. Instead, the control is based on wheel slip, which means that the WEM is sent a wheel slip value (or, equivalently, a wheel speed difference with respect to vehicle speed) which is to be maintained as the vehicle picks up speed. It is then up to the WEM to control wheel speed in order to keep wheel slip at the target wheel slip value. For instance, suppose the target wheel slip for responding to a motion instruction is 0.05. The WEM will then apply a wheel speed $\omega$ where $\omega R$ is 0.05 above the vehicle velocity $v_y$ in the relative sense discussed above. As the vehicle picks up speed, so will the wheel speed w, thereby providing a smooth vehicle launch. Torque control will be rapid since the control is local to the WEM.

According to some aspects, the method comprises controlling S31 wheel speed $\omega$ to maintain wheel slip of a respective wheel of the vehicle 100 at the target wheel slip value $\lambda_{target}$ based on a relationship $$\omega = \frac{\lambda_{target} * v_{ref} + v_x}{R}$$

where @ represents wheel speed, $\lambda_{target}$ represents the target wheel slip value, Pre is a reference velocity, $v_x$ is vehicle velocity in the reference system of the wheel, and R represents wheel radius. This relationship is based on the SAE J670 definition of wheel slip $$\lambda = \frac{R\omega - v_x}{v_{ref}}$$

discussed above. The starting wheel rotational velocity ω, when $v_x=0$, is given by $\lambda_{target}*v_{ref}/R$, i.e., a fraction of the reference velocity. This wheel rotational velocity then increases linearly with $v_x$ as $v_x/R$. It is appreciated that wheel speed control based on wheel slip can be performed based on a number of different formulas. The main principle here is that the wheel rotational velocity ω is varied in real time by the WEM during launch such that Rω is always larger than the vehicle velocity $v_y$ by an amount corresponding to the target wheel slip to be maintained. Torque control is local to the WEM, which only needs to maintain wheel rotational velocity in dependence of vehicle velocity. This allows for a very fast and accurate control loop.

According to aspects, the method comprises determining S212 the target wheel slip value $\lambda_{target}$ from the longitudinal force Fx' required to reach the requested acceleration and on a pre-determined relationship 400 between longitudinal force Fy and longitudinal wheel slip ratio.

According to some such aspects, the method comprises determining S211 the longitudinal force Fx' required to reach the requested acceleration based on a relationship Fx'=m*$a_{req}$, where m is a mass of the vehicle 100 and $a_{reg}$, is the requested acceleration by the vehicle 100. Optionally, a road resistance term $F_{load}$ can be added to the model, i.e., Fx'=m*$a_{req}$+$F_{load}$. More advanced models incorporating additional vehicle dynamics can of course improve the results.

The pre-determined relationship 400 between longitudinal force Fy and longitudinal wheel slip ratio may be pre-configured S213 in dependence of an estimated road condition. Thus, a control unit 110 may estimate road condition, such as road friction and road resistance, and then select a suitable relationship between longitudinal force Fy and longitudinal wheel slip ratio to be used in the vehicle launch control.

As noted above, the motion instruction S12 may also comprise a requested end velocity View by the vehicle 100. The target wheel slip $\lambda_{target}$ is then a pre-configured wheel slip value S22. The wheel speed control may, e.g., be based on the relationship $$\omega = \frac{\lambda_{target}*v_{ref} + v_x}{R}$$

where $\lambda_{target}$ is pre-configured to, e.g., 0.05, and $v_{ref}$ is set to $v_{reg}$. Alternatively, $\lambda_{target}$ can be swept from say 0 to 0.05 in a controlled manner over a period of time. This would mean that motor speed is slowly ramped up in a controlled manner.

To avoid too large or sudden accelerations in case road friction conditions are favorable, the method may also comprise controlling S32 wheel speed ω to maintain vehicle acceleration below a pre-configured maximum acceleration value.

According to some other aspects, the method comprises controlling S33 wheel speed ω to maintain wheel speed below a pre-configured maximum wheel speed value. This type of check will limit wheel speeds to such speeds that are deemed reasonable when setting the heavy duty vehicle in motion.

The wheel slip based control is suitable as the vehicle is set in motion. However, once the vehicle picks up speed it may be desired to revert to regular torque-based control. This switch in control approach can be based on a threshold velocity $v_{lim}$. I.e., according to some aspects, the method comprises controlling S34 vehicle velocity $v_x$ based on a torque request with a fixed wheel slip limit if the vehicle velocity $v_y$ is above a configured threshold velocity $v_{lim}$.

In case the electric propulsion system is based on a differential, as exemplified in FIG. 2B, the service brakes may be used to limit wheel slip on one side of the vehicle and thus transfer power to the other side of the vehicle. This way wheel slip can be evened out over the two sides of a vehicle during launch.

Figure 9:
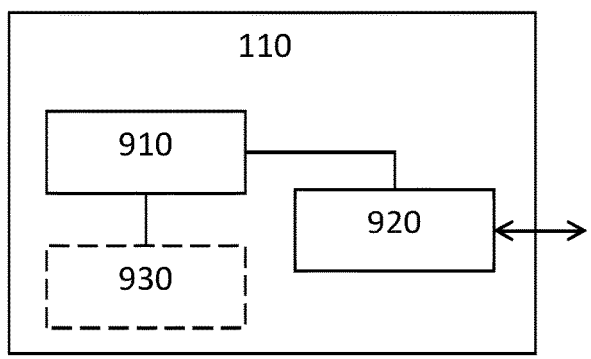
FIG. 9 schematically illustrates a control unit.

FIG. 9 schematically illustrates, in terms of a number of functional units, the components of a control unit 110 according to embodiments of the discussions herein. This control unit 110 may be comprised in the vehicle 100, e.g., in the form of a VMM unit. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA.

Particularly, the processing circuitry 910 is configured to cause the control unit 110 to perform a set of operations, or steps, such as the methods discussed in connection to FIG. 10. For example, the storage medium 930 may store the set of operations, and the processing circuitry 910 may be configured to retrieve the set of operations from the storage medium 930 to cause the control unit 110 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The control unit 110 may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the control unit 110, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Figure 10:
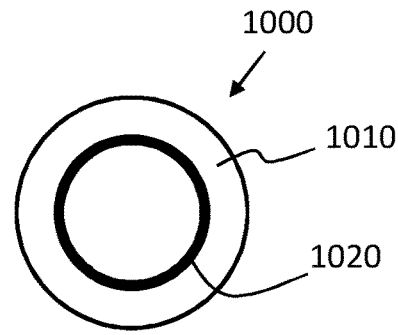
FIG. 10 shows an example computer program product.

FIG. 10 illustrates a computer readable medium 1010 carrying a computer program comprising program code means 1020 for performing the methods illustrated in FIG. 8, when said program product is run on a computer. The computer readable medium and the code means may together form a computer program product 1000.

The invention claimed is:

1. A method for setting a heavy duty vehicle in motion, the method comprising
obtaining a motion instruction for setting the vehicle in motion, the motion instruction comprising a requested acceleration by the vehicle,
determining a target wheel slip value corresponding to a wheel slip suitable for executing the motion instruction, wherein the target wheel slip is determined in dependence of a longitudinal force required to reach the requested acceleration, and
directly controlling wheel speed to maintain wheel slip of the vehicle at the target wheel slip value, by sending, to a wheel end module, a wheel slip value to be maintained, or a wheel speed difference to be maintained with respect to vehicle speed.

2. The method according to claim 1, comprising controlling wheel speed to maintain wheel slip of a respective wheel of the vehicle at the target wheel slip value based on a relationship $$\omega = \frac{\lambda_{target} * v_{ref} + v_x}{R}$$

where $\omega$ represents wheel speed, $\lambda_{target}$ represents the target wheel slip value, $v_{ref}$ is a reference velocity, $v_x$ is vehicle velocity in the reference system of the wheel, and R represents wheel radius.

3. The method according to claim 1, comprising determining the target wheel slip value from the longitudinal force required to reach the requested acceleration and on a pre-determined relationship between longitudinal force and longitudinal wheel slip ratio.

4. The method according to claim 3, comprising determining the longitudinal force required to reach the requested acceleration based on a relationship $Fx'=m*a_{req}$, where m is a mass of the vehicle and $a_{req}$ is the requested acceleration by the vehicle.

5. The method according to claim 3, wherein the pre-determined relationship between longitudinal force and longitudinal wheel slip ratio is pre-configured in dependence of an estimated road condition.

6. The method according to claim 1, wherein the motion instruction comprises a requested end velocity by the vehicle, and wherein the target wheel slip is a pre-configured wheel slip value.

7. The method according to claim 6, comprising controlling wheel speed to maintain wheel slip of the vehicle at the target wheel slip value based on the relationship $$\omega = \frac{\lambda_{target} * v_{ref} + v_x}{R}$$

where $v_{ref}$ is set to the requested end velocity by the vehicle.

8. The method according to claim 1, comprising controlling wheel speed to maintain vehicle acceleration below a pre-configured maximum acceleration value.

9. The method according to claim 1, comprising controlling wheel speed to maintain wheel speed below a pre-configured maximum wheel speed value.

10. The method according to claim 1, comprising controlling vehicle velocity based on a torque request with a fixed wheel slip limit if the vehicle velocity is above a configured threshold velocity.

11. The method according to claim 1, wherein the motion instruction corresponds to a request for a peak torque to be applied for a limited period of time.

12. The method according to claim 1, comprising transmitting a wheel speed request to an electric machine connected to drive wheels via an open differential arrangement, wherein the method comprises controlling wheel speed by the electric machine to maintain wheel slip of the vehicle at the target wheel slip value.

13. The method according to claim 1, comprising increasing the target wheel slip value from an initial value up to a pre-determined end value over a configured period of time.

14. A non-transitory computer readable medium carrying a computer program comprising program code for performing the steps of claim 1 when said program code is run on a computer or on processing circuitry of a control unit.

15. A control unit for a heavy duty vehicle, the control unit comprising processing circuitry configured to:
obtain a motion instruction for setting the vehicle in motion, the motion instruction comprising a requested acceleration by the vehicle,
determine a target wheel slip value corresponding to a wheel slip suitable for executing to the motion instruction, wherein the target wheel slip is determined in dependence of a longitudinal force required to reach the requested acceleration, and
directly control wheel speed to maintain wheel slip of the vehicle at the target wheel slip value, by sending, to a wheel end module, a wheel slip value to be maintained, or a wheel speed difference to be maintained with respect to vehicle speed.

16. A vehicle comprising the control unit according to claim 15.

* * * * *